(12) United States Patent
Ho et al.

(10) Patent No.: US 6,913,399 B2
(45) Date of Patent: Jul. 5, 2005

(54) METALLIZED OPTICAL FIBERS AND FERRULES FOR OPTICAL FIBERS FOR DIRECT ATTACHMENT TO PHOTODIODES

(75) Inventors: Yen-Ping Ho, San Jose, CA (US); Delin Li, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 10/625,255

(22) Filed: Jul. 23, 2003

(65) Prior Publication Data

US 2005/0018975 A1 Jan. 27, 2005

(51) Int. Cl.$^7$ ............................................... G02B 6/36
(52) U.S. Cl. ............................ 385/88; 385/90; 385/91; 385/92; 385/94; 385/49; 385/51; 385/52
(58) Field of Search ............................... 385/12, 14–15, 385/25–27, 31, 49–53, 88–94, 127–128, 133–140, 147

(56) References Cited

U.S. PATENT DOCUMENTS

| | | | | |
|---|---|---|---|---|
| 4,118,100 A | * | 10/1978 | Goell et al. .................... 385/92 |
| 4,192,574 A | * | 3/1980 | Henry et al. .................. 385/94 |
| 4,273,412 A | | 6/1981 | Hillegonds ................. 350/96.2 |
| 4,326,771 A | * | 4/1982 | Henry et al. .................. 385/92 |
| 4,329,190 A | * | 5/1982 | Berg et al. .................... 156/60 |
| 4,515,432 A | * | 5/1985 | Sherwin ...................... 385/49 |
| 4,653,847 A | * | 3/1987 | Berg et al. .................... 385/79 |
| 4,747,652 A | | 5/1988 | Campbell et al. ......... 350/96.15 |
| 4,834,482 A | | 5/1989 | Campbell et al. ......... 350/96.15 |
| 4,973,133 A | | 11/1990 | Matz et al. .................. 350/320 |
| 4,989,051 A | * | 1/1991 | Whitehead et al. ............ 257/80 |
| 5,032,898 A | * | 7/1991 | Bowen et al. ................ 257/433 |
| 5,071,215 A | * | 12/1991 | Hockaday ...................... 385/49 |
| 5,073,002 A | * | 12/1991 | Hockaday ...................... 385/49 |
| 5,127,072 A | | 6/1992 | Blauvelt et al. ................ 385/88 |
| 5,217,072 A | | 6/1993 | Wittrisch ..................... 166/250 |
| 5,696,657 A | | 12/1997 | Nourrcier, Jr. et al. ...... 361/193 |
| 5,822,049 A | | 10/1998 | Dimmick ...................... 356/72 |
| 6,524,017 B2 | * | 2/2003 | Lecocq et al. ................ 385/88 |
| 6,552,615 B1 | | 4/2003 | Pavan et al. ................. 330/308 |
| 6,773,169 B2 | * | 8/2004 | Ebeling et al. ............... 385/88 |
| 2002/0110328 A1 | * | 8/2002 | Bischel et al. ................ 385/49 |

FOREIGN PATENT DOCUMENTS

DE          26 30 340 A1 * 12/1978   ............ G02B/5/14

* cited by examiner

Primary Examiner—Brian Healy
Assistant Examiner—Ryan Lepisto
(74) Attorney, Agent, or Firm—Marshall, Gerstein & Borun LLP

(57) ABSTRACT

An optical component formed from a fiber directly coupled to a photodiode without any intervening optical components such as mirrors or lenses is disclosed. The optical component includes a stripped optical fiber having a core with a flat distal end that extends through a ferrule. The distal flat end of the core is printed with an annular coating of metal leaving a central portion of the core uncovered. The coated flat end of the core is initially aligned with an aperture or active area of a rear side of a back-illuminated photodiode which also includes a coating of metal. With the two parts in abutting engagement, a reflow or a partial melting process is carried out to directly couple the fiber core to the photodiode.

20 Claims, 2 Drawing Sheets

METALLIZED OPTICAL FIBERS AND FERRULES FOR OPTICAL FIBERS FOR DIRECT ATTACHMENT TO PHOTODIODES

TECHNICAL FIELD

A technique for coupling an optical fiber directly to a photodiode is disclosed. More specifically, the technique includes coating a portion of an end of an optical fiber and attaching the optical fiber directly to a metallized surface of a photodiode. As a result, a direct coupling of an optical fiber to a photodiode is achieved without the need for intervening lenses, mirrors or other imaging systems between the fiber end and the photodiode.

BACKGROUND

Optoelectronic components or active optical devices, in conjunction with optical fibers, are used for optical data transmission and reception, data storage, printing, laser pumps and a multitude of other applications. Data transmission over optical fiber will eventually surpass data transmission over copper wire because of the superior transmission capabilities of optical fiber. Specifically, while copper is reliable, it cannot operate at high signal transfer rates. For data transfer rates exceeding 50 Mb/s, special systems copper wiring is required. For data transfer rates over 150 Mb/s, use of even the best copper wiring available is questionable.

Optical fiber, on the other hand, can handle data transmission rates hundreds of times that of copper. For example, current optical fiber systems can easily handle 40 Gb/s over a single fiber. And advances in technology will only result in increases in data transfer rates over a single fiber.

As a result, to meet the data transfer rate demand generated by the dramatic increase in Internet users, related bandwidth intensive applications, virtual private networking (VPN), storage area networking (SAN) and other rich media streaming over the Internet, telecommunications carriers have designed and installed new networks based upon optical fiber, have deployed additional fiber in their existing networks and have used advances in optical technologies such as dense wavelength-division multiplexing (DWDM).

In all communications networks relying upon the use of optical fiber, the fibers must be coupled to optoelectric components, such as light emitting devices and light receiving elements. Typically, the communication path is in the form of an optical fiber, the ends of which are coupled to light transmitting and light receiving elements. In order to assure maximum optical coupling between the ends of the fibers and the optical devices to which they are coupled, it is important to precisely fix the axial distance between the end of the fiber and the face of the optical element to which it is to be coupled as well as accurately aligning the end of the fiber with the prescribed location on the surface of the light emitting or light receiving element.

Further, with respect to the coupling of an optical fiber to a photodiode, currently available coupling devices are bulky, complex and incur a high cost of manufacture while failing to provide the compact size needed for current and future optical system components. For example, a typical photodiode optical fiber ferrule attachment requires an imaging lens, a mirror or both, all disposed between the fiber and the photodiode detector. Further, a two or three dimensional photodiode-fiber alignment process is required in order to optimize the coupling efficiency. Thus, this process is complicated and costly especially for single-mode fiber application where accurate alignment is required.

Therefore, there is a need for an improved method for coupling photodiodes to optical fibers which achieves the requisite coupling efficiency and which lowers the manufacturing costs by providing a less complicated process.

BRIEF DESCRIPTION OF THE DRAWINGS

The disclosed methods for coupling optical fibers to photodiodes and disclosed optoelectronic components incorporating the same are described more or less diagrammatically in the accompanying drawings wherein.

DETAILED DESCRIPTION OF THE PRESENTLY PREFERRED EMBODIMENTS

Figure 1:
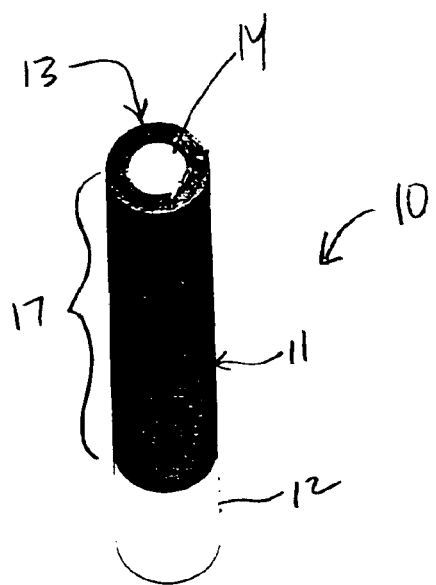
FIG. 1 is a perspective view of an end of an optical fiber that extends through a ferrule and with a distal portion that is metallized for direct connection to a photodiode in accordance with this disclosure.

FIG. 1 is a perspective illustration of a metallized optical fiber ferrule 10 made in accordance with this disclosure. An optical fiber 11 extends through a ferrule 12 and terminates at a distal end 13. The fiber 11 includes a core 14 initially disposed within a cladding (not shown) which, in turn, is initially disposed within a buffer (not shown). The cladding and buffer have been stripped off of the core upstream of the ferrule 12 by techniques that are known in the art. The flat distal end 13 of the fiber 11 or the facet 13 is coated with an annular metal layer that essentially covers the buffer 16. Optionally, the distal portion 17 of the fiber 11 that extends beyond the ferrule 12 may be coated with a metal layer as well as shown in FIG. 1.

Figure 2:
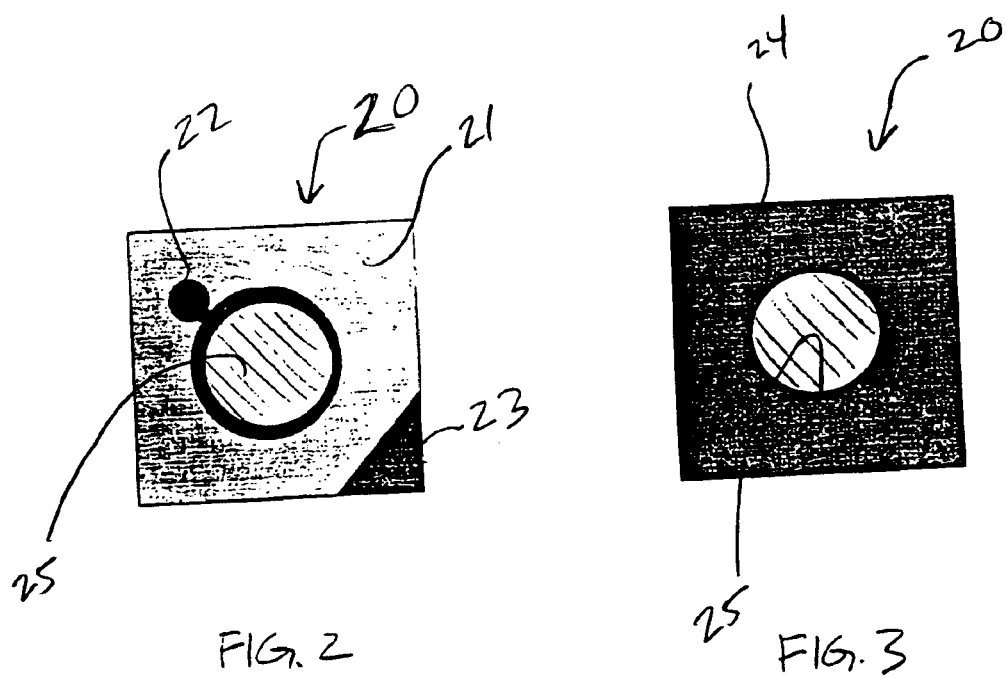
FIG. 2 is a front plan view of a back-illuminated photodiode for use in the disclosed methods and disclosed optoelectronic components.
Figure 3:
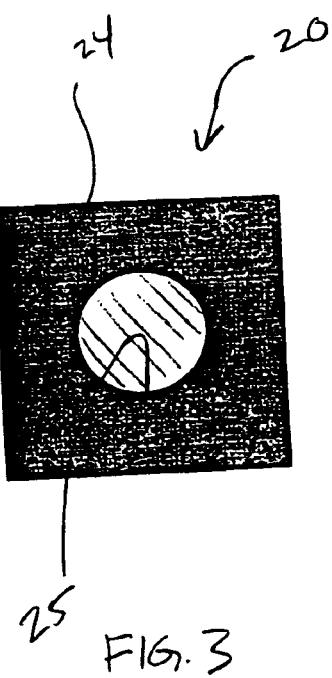
FIG. 3 is a rear plan view of the photodiode disclosed in FIG. 2.

Turning to FIG. 2, the front side 21 of the photodiode 20 may be equipped with an anode 22 and a cathode 23 which, as shown in FIG. 3, extends to the backside 24 of the photodiode 20. Referring back to FIG. 2, the anode 22 encircles the active area 25 of the photodiode 20 through which light is received for conversion to electrical current or an electrical signal. In order to effectively couple the photodiode 20 to the fiber 11, at least part of the core 14 of the fiber 11 must be aligned in the active area 25. The cathode 23 comprises a metal layer which extends over the rear side 24 of the photodiode 20 but, of course, does not cover the active area 25. The cathode metal pattern of rear side 24 should be designed such that it can match the metal pattern on the fiber end for the self align process.

Figure 4:
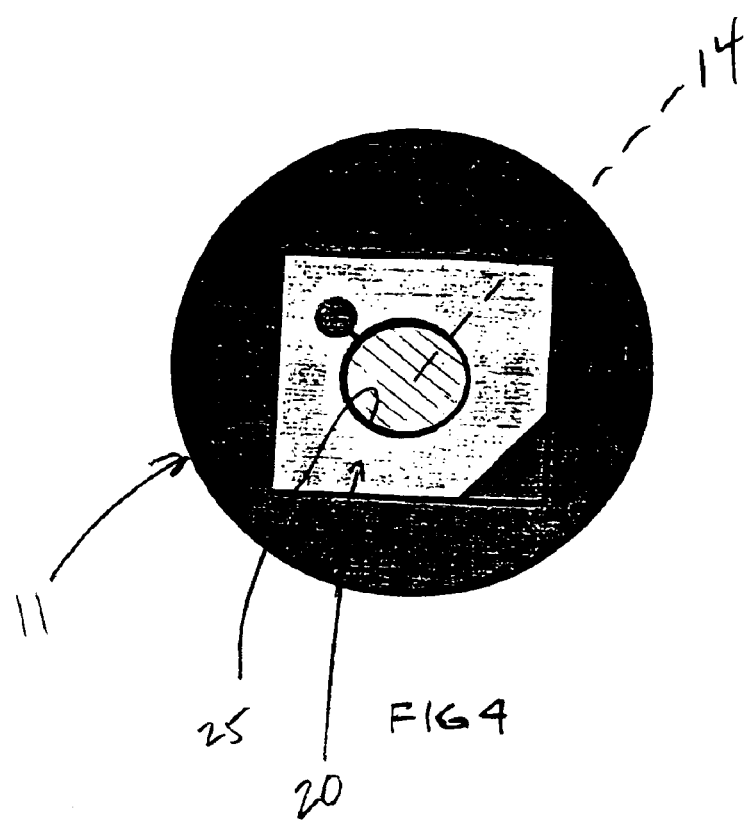
FIG. 4 is an end view of the metallized fiber shown in FIG. 1 as directly coupled to the rear side of the photodiode shown in FIGS. 2 and 3.

As shown in FIG. 4, to couple the fiber 11 to the photodiode 20, all that is required is a single rough alignment of the fiber core 14 with the active area 25. Specifically, with the rear side 24 of the photodiode 20 facing the end facet 13 of the fiber 11, the core 14 of the fiber and the active area 25 of the photodiode are aligned and pressed into engagement with one another so that the stripped fiber 11 is in abutting engagement with the metallized rear side 24 of the photodiode 20. Then, with the core 14 of the fiber 11 aligned with the active area 25 of the photodiode 20, the combination is heated to a point where the annular metal layer covering an annular portion of the core 14 and the metal layer covering the rear side 24 of the photodiode reflow and the surface tension created by the reflowed metal results in the alignment being maintained or self-alignment during the subsequent cooling. After cooling, the metallized fiber 11 and photodiode 20 are butt-coupled together.

Figure 5:
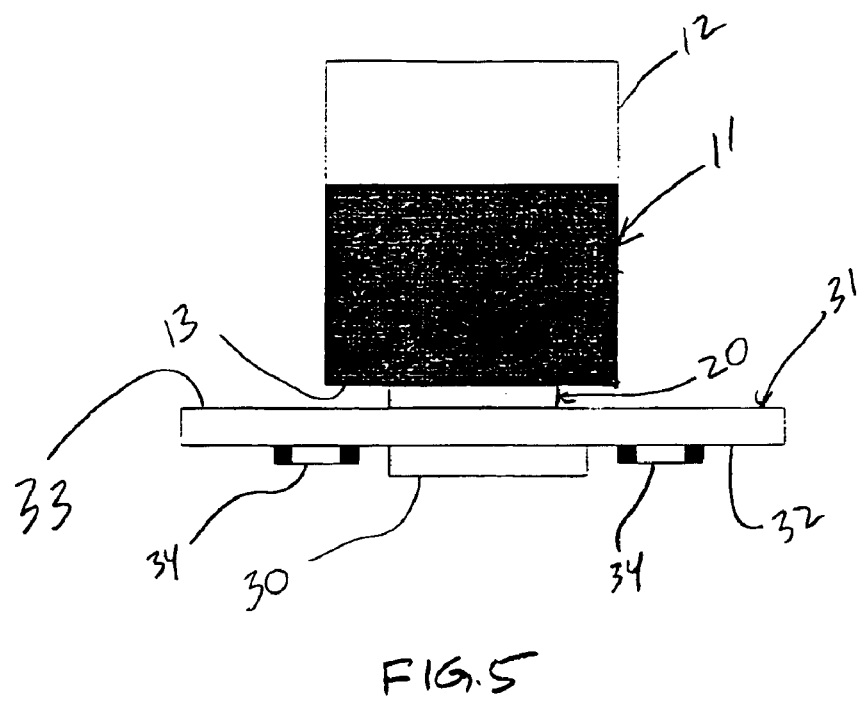
FIG. 5 is a plan view of the fiber, ferrule and back-illuminated photodiodes shown in FIGS. 1–4 with the front side of the photodiode (see FIG. 2) coupled to a substrate which, in turn, is coupled to a transimpedence amplifier (TIA) on an opposite side thereof.

As shown in FIG. 5, a TIA chip 30 may be combined with the photodiode 25 by using a substrate 31 with printed electrical connection lines electrically connecting the TIA chip to the photodiode 20. In the embodiment shown in FIG. 5, the TIA chip is mounted to a first side 32 of the substrate 31. The photodiode 20 is mounted to the end facet 13 of the fiber 11 as discussed above. Then, the photodiode is mounted to the second surface 33 of the substrate 21. Additional circuit components 34 may also be included on the substrate 31. One advantage of the embodiment shown in FIG. 5 is the surface mounting of the photodiode 20 and the TIA chip 30, thereby eliminating wire bonds and the undesired parasitic inductance that accompanies the use of wire bonds.

Thus, one method for manufacturing the embodiment shown in FIG. 5 includes: attaching the TIA chip 30 to one side of the substrate 31, the substrate being equipped with printed electrical connection lines for electrically connecting the TIA chip 30 to the photodiode chip 20; attaching any additional electrical components 34 to the side 32 of the substrate 31 on which the TIA chip 30 is attached; coating the stripped fiber 11 coated with at least an annular coating of metal to form an end facet 13 of the core 14 as shown in FIG. 1; optionally, coating the distal portion 17 of the core 14 with metal also as shown in FIG. 1; the moving rear side 24 of a back-illuminated photodiode 20 into abutting engagement with the end facet 13 of the fiber 11 with the core 14 of the fiber 11 in alignment or registry with the active area 25 of the photodiode 20 as shown in FIG. 4; carrying out a reflow process under temperatures sufficient to reflow the metal providing the annular coating on the end facet of the fiber 13 (and the distal portion 17 of the core 14 if it is also coated) and the metal coating on the rear side 24 of the photodiode 20 to reflow the metal together in order to bond the photodiode 20 to the end facet 13 of the core 14 as shown in FIG. 5; cooling the assembly to secure the photodiode 20 in place on the fiber 11; and, mounting the photodiode 20 to the other side 33 of the substrate 31 as shown in FIG. 5. In addition to the reflow processes discussed above, the metal layers on the end facet 13 of the fiber 11 and rear side 24 of the photodiode 20 may also be used as solder layers or brazing layers.

The metallized layers on one or more of the end facet 13 and distal portion of the core 14 and rear side 24 of the photodiode 20 may be deposited using physical vapor deposition (PVD) techniques such as screen printing or other suitable processes such as sputtering or evaporation. The conductive material used for the metallized layers may include metal such as copper, gold, tin, copper/tin alloys, tungsten, lead, nickel, palladium, KOVAR® or other similar metals. Because the metallized layers are used for soldering, brazing or reflow processes, thick film deposition techniques are preferred. Preferably, the metallized layers would have thicknesses of about 10 µm. However, if desired, thin film metallization techniques may also be employed.

Thus, the disclosed methods and embodiments simplify the attachment process or coupling process between a fiber 11 and a photodiode 20. Two-dimensional or three-dimensional active alignment processes are no longer necessary and, instead, a single alignment between the fiber 11 and active area 25 of the photodiode chip is all that is necessary. The annular coating or donut pattern of metal on the end facet 13 of the core 14 can be applied using conventional screen printing techniques. In essence, the disclosed methods utilize surface mount technology to achieve a high accuracy alignment. The disclosed methods take advantage of the alignment properties and surface tension aerated during the melt of reflow process which enable the photodiode 20 and fiber 11 or core 14 to be aligned passively.

In the foregoing description, the disclosed structures and manufacturing methods have been described with reference to exemplary embodiments. It will, however, be evident that various modifications and changes may be made thereto without departing from the broader spirit and scope of this disclosure. The above specification and figures accordingly are to be regarded as illustrative rather than restrictive. It is therefore intended that the present disclosure be unrestricted by the foregoing description and drawings, except as may appear in the following appended claims.

What is claimed is:

1. An optical component comprising:
    an optical fiber comprising a core that comprises a distal portion that terminates at a flat end,
    the distal portion of the fiber extending through and beyond a ferrule so that the flat end at the core is disposed beyond the ferrule,
    the flat end of the core being coated with an annular layer of metal, leaving a central portion of the core uncovered,
    a back-illuminated photodiode comprising a front side and a back side, the back side comprising a metal surface with an aperture disposed therein,
    the flat end of the core being bonded to the back side of the photodiode so that the annular layer of metal encircles the aperture and is metallically bonded to the metal surface of the photodiode with the uncovered central portion of the core in alignment with the aperture.

2. The optical component of claim 1 wherein the annular metal layer and metal surface of the back side of the photodiode are reflowed together to bond the fiber to the photodiode.

3. The optical component of claim 1 wherein the front side of the photodiode comprises and anode and a cathode.

4. The optical component of claim 1 wherein the front side of the photodiode is mounted on a first side of a substrate, the substrate comprising a second side that is connected to a transimpedance amplifier (TIA), the TIA and photodiode being electrically connected.

5. The optical component of claim 4 wherein the substrate comprises printed electrical connection lines for connecting the TIA to the photodiode.

6. The optical component of claim 1 wherein an outer surface of the distal portion of the core is metallized from the flat end up to the ferrule.

7. The optical component of claim 1 wherein the optical component is a transponder or a transceiver.

8. A method of fabricating an optical component comprising:
    coating a flat end of a core of an optical fiber with an annular coating of metal leaving a central portion of the core uncovered, aligning and engaging the flat metallized end of the core with a back side of a back-illuminated photodiode that comprises a metal surface with an aperture disposed therein for the reception of light so that the uncovered central portion of the core is in alignment with the aperture, at least partially melting the annular coating of metal of the flat end of the fiber and the metal surface of the back side of the photodiode to bond the metal surface of the photodiode to the flat end of the core with the uncovered central portion of the core in alignment with the aperture.

9. The method of claim 8 wherein the at least partially melting is achieved by reflowing the annular metal layer of the core and the metal layer on the rear side of the photodiode.

10. The method of claim 8 wherein the front side of the photodiode comprises and anode and a cathode.

11. The method of claim 8 wherein the front side of the photodiode is mounted on a first side of a substrate, the substrate comprising a second side that is connected to a transimpedance amplifier (TIA), the TIA and photodiode being electrically connected.

12. The method of claim 11 wherein the substrate comprises printed electrical connection lines for connecting the TIA to the photodiode.

13. The method of claim 8 wherein the coating further comprises coating an outer surface of the distal portion of the core from the flat end up to a point where the core extends out of a ferrule.

14. The method of claim 8 wherein the optical component is a transponder or a transceiver.

15. An optical component comprising:

an optical fiber comprising a core comprising a distal portion that terminates at a flat end, the distal portion of the core extending through and beyond a ferrule so that the flat end is disposed beyond the ferrule with a section of exposed core disposed between the ferrule and the flat end of the core, the flat end of the core being coated with an annular layer of metal leaving a central portion of the flat end of the core uncovered and the coating extending over an outer surface of the section of exposed core, a back-illuminated photodiode comprising a front side and a back side, the back side comprising a metal surface with an aperture disposed therein for the reception of light, the flat end of the core being bonded to the back side of the photodiode so that the annular layer of metal encircles the aperture and is metallically bonded to the metal surface of the photodiode with the uncovered central portion of the flat end of the core in alignment with the aperture.

16. The optical component of claim 15 wherein the metal layer coated onto the fiber and metal surface of the back side of the photodiode are reflowed together to metallically bond the fiber to the photodiode.

17. The optical component of claim 15 wherein the front side of the photodiode comprises and anode and a cathode.

18. The optical component of claim 15 wherein the front side of the photodiode is mounted on a first side of a substrate, the substrate comprising a second side that is connected to a transimpedance amplifier (TIA), the TIA and photodiode being electrically connected.

19. The optical component of claim 18 wherein the substrate comprises printed electrical connection lines for connecting the TIA to the photodiode.

20. The optical component of claim 18 wherein the optical component is a transponder or a transceiver.

* * * * *

UNITED STATES PATENT AND TRADEMARK OFFICE
CERTIFICATE OF CORRECTION

PATENT NO. : 6,913,399 B2
DATED : July 5, 2005
INVENTOR(S) : Yen-Ping Ho et al.

It is certified that error appears in the above-identified patent and that said Letters Patent is hereby corrected as shown below:

Column 4,
Line 49, please delete "and" and replace with -- an --.

Column 5,
Line 18, please delete "and" and replace with -- an --.

Column 6,
Line 23, please delete "and" and replace with -- an --.

Signed and Sealed this

Eleventh Day of October, 2005

JON W. DUDAS
*Director of the United States Patent and Trademark Office*